(12) United States Patent
Pan et al.

(10) Patent No.: US 11,461,762 B2
(45) Date of Patent: Oct. 4, 2022

(54) NFC PAYMENT METHOD AND APPARATUS IMPLEMENTED ON MOBILE TERMINAL

(71) Applicant: Baidu Online Network Technology (Beijing) Co., Ltd., Beijing (CN)

(72) Inventors: Rendan Pan, Beijing (CN); Wenwen Guo, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 501 days.

(21) Appl. No.: 15/429,065

(22) Filed: Feb. 9, 2017

(65) Prior Publication Data
US 2018/0075445 A1 Mar. 15, 2018

(30) Foreign Application Priority Data
Sep. 14, 2016 (CN) .......................... 201610827273.2

(51) Int. Cl.
*G06Q 20/32* (2012.01)
*G06Q 20/40* (2012.01)
(52) U.S. Cl.
CPC ....... *G06Q 20/3278* (2013.01); *G06Q 20/401* (2013.01); *G06Q 20/4012* (2013.01); *G06Q 20/4014* (2013.01)
(58) Field of Classification Search
CPC ............. G06Q 20/3278; G06Q 20/401; G06Q 20/4012; G06Q 20/4014
See application file for complete search history.

(56) References Cited

U.S. PATENT DOCUMENTS

| | | | |
|---|---|---|---|
| 9,865,015 B2* | 1/2018 | Moghadam | G06Q 30/0641 |
| 2010/0211504 A1* | 8/2010 | Aabye | G06Q 20/204 |
| | | | 455/41.1 |

(Continued)

FOREIGN PATENT DOCUMENTS

| CN | 103455913 | 12/2013 |
|---|---|---|
| CN | 103516891 | 1/2014 |

(Continued)

OTHER PUBLICATIONS

Profis, Sharon. "Everything you need to know about NFC and mobile payments," https://www.cnet.com/tech/mobile/how-nfc-works-and-mobile-payments/ (Sep. 9, 2014). (Year: 2014).*

(Continued)

*Primary Examiner* — Elizabeth H Rosen
(74) *Attorney, Agent, or Firm* — Knobbe Martens Olson & Bear LLP

(57) ABSTRACT

Disclosed embodiments include an NFC payment method and apparatus implemented on a mobile terminal. In some embodiments, an NFC payment function of a mobile terminal is activated; an NFC connection to a POS terminal is directly established in an inactive-screen state, so as to start the current payment process; payment authentication is performed on a user, so as to instruct the POS terminal to make a payment when the authentication is completed. Some embodiments of the present disclosure provides a more convenient and efficient NFC payment manner. In some embodiments, the system can directly invoke NFC quick payment in an inactive-screen state, which significantly reduces an operation time and operation cost of a user. Moreover, the user may need to be authenticated before the payment, which also guarantees the security of the payment. Therefore, some embodiments of the present disclosure provides better mobile quick payment experience for the user.

17 Claims, 5 Drawing Sheets

(56) References Cited

U.S. PATENT DOCUMENTS

| | | | |
|---|---|---|---|
| 2010/0231383 A1* | 9/2010 | Levine | H04W 52/0264 340/540 |
| 2013/0030933 A1* | 1/2013 | Talach | G06Q 20/204 705/17 |
| 2014/0337207 A1* | 11/2014 | Zhang | G06Q 20/3267 705/41 |
| 2015/0036185 A1* | 2/2015 | Asai | H04N 1/00129 358/1.15 |
| 2016/0239821 A1* | 8/2016 | Park | G06F 21/32 |
| 2017/0344976 A1* | 11/2017 | Lee | H04W 52/34 |

FOREIGN PATENT DOCUMENTS

| | | |
|---|---|---|
| CN | 104641388 | 5/2015 |
| CN | 104820919 | 8/2015 |
| CN | 105550863 | 5/2016 |
| CN | 205407821 | 7/2016 |
| CN | 105844462 | 8/2016 |
| CN | 105868978 | 8/2016 |
| WO | WO2009/058009 | 5/2009 |

OTHER PUBLICATIONS

Dodson, Ben; Hristo Bojinov; Monica S. Lam. "Touch and Run with Near Field Communication (NFC)," Computer Science Department, Stanford University, (2010). (Year: 2010).*

* cited by examiner

NFC PAYMENT METHOD AND APPARATUS IMPLEMENTED ON MOBILE TERMINAL

CROSS-REFERENCE TO RELATED APPLICATIONS

This application claims the priority of Chinese Patent Application No. 201610827273.2, titled "NFC Payment Method and Apparatus Implemented on Mobile Terminal," filed on Sep. 14, 2016, which is hereby incorporated by reference in its entirety.

TECHNICAL FIELD

The present disclosure relates to the field of mobile payment technology, and in particular, to a near field communication (NFC) payment technology implemented on a mobile terminal.

BACKGROUND

In most existing mobile payments, a payment process needs to be started in a payment application (APP). For example, when a user desires to make a payment, she opens a payment APP and scans a QR code of a payee or provides her own QR code for the payee to scan, so as to establish a connection and complete the payment.

Appreciably, the above-mentioned mobile payment process is still relatively complex. If the mobile phone of the user is currently in a locked-screen state, the user needs to first unlock the screen, enter the payment APP, bring up "scan" or "payment code" to establish a payment connection to the payee, and progress to start the payment process.

In addition, in most existing NFC payment, a POS terminal initiates payment to a settlement gateway of a bank after a mobile phone establishes an NFC connection to the POS terminal.

SUMMARY

An objective of some embodiments of the present disclosure is to provide an NFC payment method and apparatus implemented on a mobile terminal.

According to an aspect of some embodiments of the present disclosure, an NFC payment method implemented on a mobile terminal is provided, the method comprising the following steps:

activating an NFC payment function of the mobile terminal;

wherein the method further comprises:

starting a current payment process after detecting the mobile terminal in an inactive-screen state establishing a direct NFC connection to a POS terminal; and performing an payment authentication on a user, and instructing the POS terminal to process the payment after completing the authentication.

According to another aspect of some embodiments of the present disclosure, an NFC payment apparatus implemented on a mobile terminal is further provided, wherein the apparatus comprises a processor configured to:

activate an NFC payment function of the mobile terminal;

start a current payment process after detecting the mobile terminal in an inactive-screen state establishing a direct NFC connection to a POS terminal; and perform payment authentication on a user, and instruct the POS terminal to process the payment after completing the authentication.

Compared with the existing mobile payment technology, some embodiments of the present disclosure provide a more convenient and efficient NFC payment method. Some embodiments of the present disclosure can directly invoke NFC quick payment without activating a screen, which significantly reduces an operation time and operation cost of a user. Moreover, the user needs to be authenticated before the payment, which also guarantees the security of the payment. Therefore, some embodiments of the present disclosure provide better mobile quick payment experience for the user.

BRIEF DESCRIPTION OF THE DRAWINGS

Other features, objectives and advantages of the present disclosure will become more apparent upon reading the detailed description to non-limiting embodiments with reference to the accompanying drawings, wherein.

Identical or similar reference numerals in the accompanying drawings represent identical or similar components.

DETAILED DESCRIPTION OF EMBODIMENTS

Figure 1:
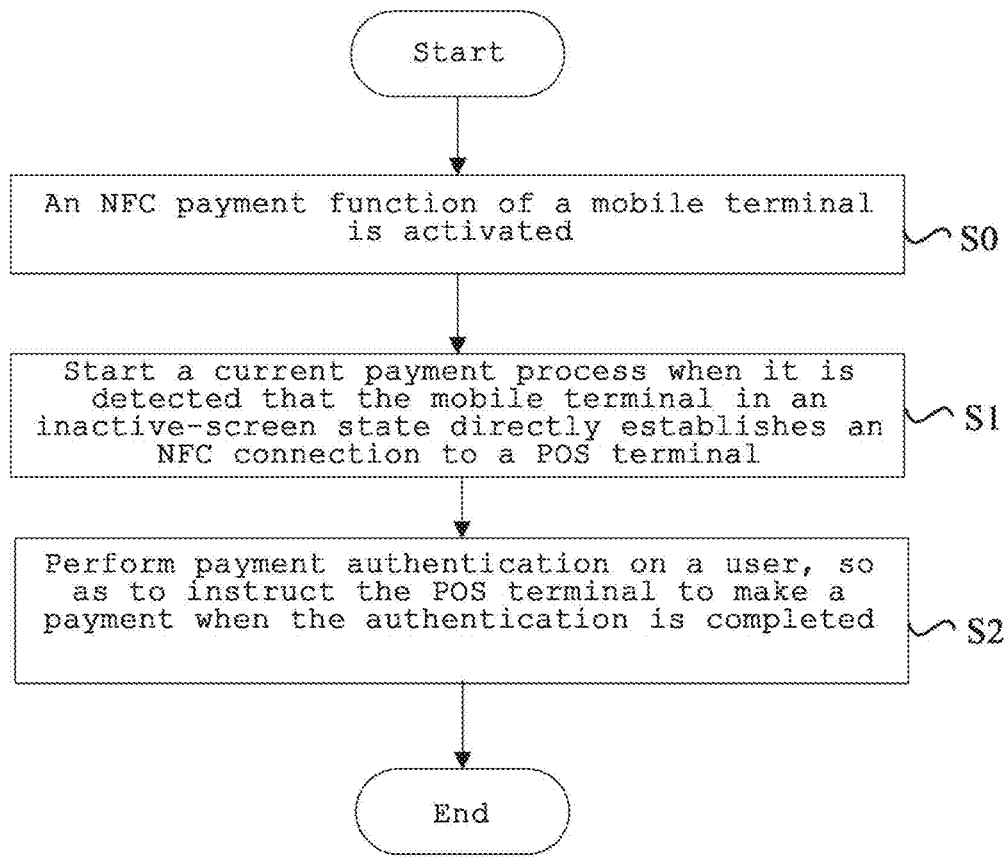
FIG. 1 is a flowchart of an NFC payment method implemented on a mobile terminal according to some embodiments of the present disclosure.

Before embodiments are discussed in more detail, it should be noted that some embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also include additional steps not included in the accompanying drawings. The processes may correspond to methods, functions, procedures, subroutines, subprograms, etc.

The "computing device" mentioned in the context, also referred to as "computer", refers to a smart electronic device that can execute a predetermined processing procedure such as numerical calculation and/or logical calculation by running a predetermined program or instruction, and may include a processor and a memory. The processor can execute a program instruction pre-stored in the memory to execute the predetermined processing procedure, or hardware such as an ASIC, an FPGA, or a DSP executes the predetermined processing procedure, or the predetermined processing procedure is implemented by a combination of the two. The computing device includes, but is not limited to, a server, a personal computer (PC), a notebook computer, a tablet computer, a smart phone, and the like.

The computing device, for example, includes user equipment and a network devices. The user equipment includes, but is not limited to, a personal computer (PC), a notebook computer, a mobile terminal, and the like. The mobile terminal includes, but is not limited to, a smart phone, a PDA, and the like. The network device includes, but is not limited to, a single network server, a server group comprising of multiple network servers, or a cloud-computing-based cloud including numerous computers or network servers, where the cloud computing is one of the distributed computing technologies, or a virtual super computer including a group of loosely-coupled computers. The computing device may run alone to implement the present disclosure, or may connect to a network and implement the present disclosure by means of interaction operations with other computing devices in the network. The network where the computing device is located includes, but is not limited to, the Internet, a wide area network, a metropolitan area network, a local area network, a VPN network, and the like.

It should be noted that, the user equipment, network device, and network are merely examples, and if applicable to the present disclosure, other existing or possible computing devices or networks in the future should also be included in the protection scope of the present disclosure, and incorporated herein by reference.

Methods discussed below (some of which are illustrated by the flowcharts) may be implemented by hardware, software, firmware, middleware, microcode, hardware interpretation languages, or any combination thereof. When implemented in software, firmware, middleware or microcode, program code or code segments for performing necessary tasks may be stored in a machine or computer readable medium such as a storage medium. One or more processors may implement the necessary tasks.

Specific structural and functional details disclosed herein are merely representative for the purpose of describing embodiments of the present disclosure. However, the present disclosure may be embodied in many alternative forms and should not be construed as limited to only the embodiments set forth herein.

It should be understood that, although the terms "first," "second," etc. may be used herein to describe various units, these units should not be limited by these terms. These terms are only used to distinguish one unit from another. For example, a first unit could be referred to as a second unit, and similarly, a second unit could be referred to as a first unit, without departing from the scope of the embodiments. As used here, the term "and/or" includes any and all combinations of one or more of associated items listed.

It should be understood that when a unit is referred to as being "connected" or "coupled" to another unit, it can be directly connected or coupled to the other unit or an intervening unit may be present. In contrast, when a unit is referred to as being "directly connected" or "directly coupled" to another unit, there is no intervening unit present. Other words for describing the relationship between units, such as "between" versus "directly between", and "adjacent" versus "directly adjacent", should be interpreted in a like fashion.

The terminology used herein is for the purpose of describing particular embodiments only and is not intended to limit the embodiments. As used here, the singular forms "a" and "an" are intended to include the plural forms as well, unless otherwise specified clearly in the context. It should be further understood that the terms "comprise" and/or "include", when used here, specify the presence of stated features, integers, steps, operations, units and/or components, but do not preclude the presence or addition of one or more other features, integers, steps, operations, units, components and/or groups thereof.

It should also be mentioned that in some alternative implementations, the functions/actions mentioned may occur out of the order shown in the accompanying drawings. For example, two figures shown in succession may in fact be executed concurrently or may sometimes be executed in the reverse order, depending on the functions/actions involved.

Some embodiments of the present disclosure may be implemented by a computing device mobile terminal. Typically, some embodiments of the present disclosure may be implemented by a smart phone supporting an NFC function. A typical application scenario may be that: an NFC payment function of the smart phone is activated in advance, and when it is planned to perform NFC payment, the smart phone in an inactive-screen state directly establishes an NFC connection to a POS terminal, so as to start the current payment process, and further performs payment authentication on a user, so as to instruct the POS terminal to make a payment when the authentication is completed.

Some embodiments of the present disclosure may be implemented by an APP, such as a payment APP, installed and running in a mobile terminal. Further, the solution of some embodiments of the present disclosure may be integrated in the aforementioned payment APP as a functional module.

It should be noted that, the "payment APP" is a functional limitation to the APP, and an APP can be considered as the "payment APP" in some embodiments of the present disclosure as long as it includes a payment function.

For ease of description, examples of performing an NFC quick payment by a smart phone/payment APP are mostly used in the following. However, those skilled in the art should understand that such examples are merely used for illustrating the present disclosure, and should not be construed as any limitation to the present disclosure.

The present disclosure is further described in detail below with reference to the accompanying drawings.

FIG. 1 is a flowchart of a method according to some embodiments of the present disclosure, which specifically shows an NFC payment process implemented on a mobile terminal. More specifically, the foregoing NFC payment process can be implemented by a payment APP installed in the mobile terminal.

As shown in FIG. 1, at step S0, an NFC payment function of the mobile terminal is activated; at step S1, when it is detected that the mobile terminal in an inactive-screen state directly establishes an NFC connection to a POS terminal, the payment APP directly starts a current payment process; and at step S2, the payment APP performs payment authentication on a user, so as to instruct the POS terminal to make a payment when the authentication is completed.

Step S0 belongs to a presetting process of the NFC payment, and steps S1 and S2 belong to a payment process of the NFC payment.

In terms of the occurrence order, the presetting process is naturally prior to the payment process. However, those skilled in the art can understand that the foregoing two processes do not occur in close succession. Instead, after the NFC payment function of the mobile terminal is activated, the NFC payment process at steps S1 and S2 occurs only when the user wishes to make a quick payment by using the NFC payment function.

Specifically, at step S0, the NFC payment function of the mobile terminal is activated.

Herein, the NFC payment function may be activated through at least the following approaches:

1) Establish an association with a payment APP for NFC payment after the NFC function of the mobile terminal is started.

For example, for a smart phone supporting the NFC function, after the user starts the NFC function in the smart phone thereof, one or more APPs that can invoke the NFC function will be provided in an interface of the NFC function, and the user selects a payment APP to complete the association between the NFC function and the payment APP, thereby activating the NFC payment function of the payment APP.

Those skilled in the art should understand that the foregoing example is merely used for illustration and should not be construed as any limitation to the present disclosure. After the NFC function is started, the mobile terminal may also provide, using other approaches, APPs that can be associated with, for example, optional APPs by using a pop-up box. Therefore, those skilled in the art should understand that, although the present disclosure is not exhaustive herein, all other existing or future approaches of providing APPs that can be associated with should be included in the protection scope of some embodiments of the present disclosure, and incorporated herein by reference.

2) Enable the NFC payment function in a payment APP for NFC payment.

For example, the user opens a payment APP planned to be used for NFC payment, and when detecting that the mobile phone of the user supports the NFC function, the payment APP may prompt the user to enable the NFC payment function, so that NFC quick payment can be enabled after the user chooses to enable the function.

In some embodiments of the present disclosure, after the NFC quick payment function is enabled, the payment APP may further provide an entry of the NFC payment in an interface.

Those skilled in the art should understand that the foregoing example is merely used for illustration and should not be construed as any limitation to the present disclosure. After the payment APP detects that the mobile phone of the user supports the NFC function, the user may be provided with multiple approaches of enabling the NFC payment function, for example, the user may choose to enable the NFC payment function in the settings. Therefore, those skilled in the art should understand that, although some embodiments of the present disclosure is not exhaustive herein, all other existing or future approaches to enable an NFC payment function in a payment APP should be included in the protection scope of some embodiments of the present disclosure, and incorporated herein by reference.

Further, those skilled in the art should understand that the foregoing example of activating an NFC payment function is merely used for illustration, and should not be construed as any limitation to the present disclosure. All other existing or future approaches to activate an NFC payment function should be included in the protection scope of some embodiments of the present disclosure, and incorporated herein by reference.

Subsequently, the user can make a quick payment when hoping to use NFC payment.

At step S1, when the user plans to perform NFC payment, once the payment APP detects that the mobile terminal in the inactive-screen state directly establishes an NFC connection to the POS terminal, the current payment process is started.

In a specific payment scenario, when the user plans to perform NFC payment, the user can establish an NFC connection by directly touching the POS terminal with the mobile phone, without activating the screen of the mobile phone.

The inactive-screen state includes, but is not limited to, a locked-screen state, a screen-off state, and the like. Some embodiments of the present disclosure is intended to provide NFC quick payment to the user, so that the user can directly invoke, in the inactive-screen state through the NFC connection, the NFC payment function of the associated payment APP to make a quick payment.

Therefore, in the inactive-screen state, the payment APP constantly monitors an NFC event of the mobile phone, and starts the payment process after an NFC connection between the mobile phone and the POS terminal is detected.

For example, after the user enables the NFC quick payment function, when the mobile phone is in the inactive-screen state, an NFC payment control in the payment APP may constantly monitor an NFC event of the mobile phone, and after the mobile phone touches the POS terminal and establishes an NFC connection to the POS terminal, the mobile phone may notify the NFC payment control of the NFC event, so that the NFC payment control invokes the payment APP, to perform payment authentication on the user in subsequent Step S2.

At step S2, the payment APP performs payment authentication on the user, so as to instruct the POS terminal to make a payment when the authentication is completed.

The "payment authentication" herein means to perform identity authentication on the user before payment. An authentication approach includes, but is not limited to, any existing identity authentication approaches applicable to some embodiments of the present disclosure, such as password authentication, fingerprint authentication, and voice authentication.

For example, the payment APP presents a password input interface to the user, to prompt the user to input a payment password; after the user inputs the payment password, if the password input by the user matches a payment password preset by the user, the current authentication succeeds.

Generally, when the user uses a payment APP for the first time, the payment APP will prompt the user to associate a debit/credit card for mobile payment, and will record a payment password that is used when the user makes a payment by using the associated debit card/credit card.

After authenticating the user, the payment APP may send an NFC signal to the POS terminal, to instruct the POS terminal to carry out the current payment.

Subsequently, the POS terminal submits a payment request to a payment gateway and completes the current payment.

For example, the payment gateway may be a payment server corresponding to the payment APP, the POS terminal provides a payment request to the payment server, and the payment server deducts money from the debit card/credit card associated by the user to the payment server, thereby completing the current payment.

In some embodiments of the present disclosure, the payment gateway may notify the payment APP of a payment completion message indicating that the current payment is completed.

Accordingly, the payment APP receives the payment completion message from the payment gateway, to notify the user of the completion of the current payment.

Herein, approaches to notify the user of the completion of the current payment include at least the following ones:

1) Present a payment completion page to the user.

For example, after receiving the payment completion message, the payment APP presents to the user a payment completion page, which simply represents the completion of the current payment.

2) Present a payment detail page to the user.

For example, after receiving the payment completion message, the payment APP presents to the user a payment detail page, which may specifically include various messages about the current payment, such as an order number, an order time, and an order amount.

3) First present a payment completion page to the user, and then present a payment detail page to the user.

For example, after receiving the payment completion message, the payment APP first presents a payment completion page to the user, to notify the user that the current payment has been completed, and subsequently, may further present to the user a payment detail page, which may specifically include various messages about the current payment, such as an order number, an order time, and an order amount.

In addition, according to some embodiments of the present disclosure, when a distance between the mobile terminal and the POS terminal exceeds a predetermined distance, the mobile terminal further prompts the user to move closer to the POS terminal.

A maximum communication distance of the NFC connection needs to meet a particular requirement, and when the distance between the mobile phone and the POS terminal increases, for example, the distance is going to exceed the maximum communication distance, the NFC connection between the two may be interrupted. Therefore, an alerting distance may be set with reference to the maximum communication distance, and when it is detected that the distance between the mobile phone and the POS terminal exceeds the alerting distance, the user is prompted to move closer to the POS terminal.

According to some embodiments of the present disclosure, when the current NFC connection is interrupted, the mobile terminal prompts the user to re-establish an NFC connection to the POS terminal, so as to start a new payment process.

Herein, the interruption of the NFC connection may be caused by various communication problems, for example, the distance between the mobile phone and the POS terminal exceeds the NFC maximum communication distance, or the payment times out.

After the current NFC connection to the POS terminal is interrupted, the payment APP may prompt the user to re-establish an NFC connection to the POS terminal, so that the user touches the POS terminal with the mobile phone again to re-establish an NFC connection, and a new payment process is started, including authenticating the user again and making a payment again after the authentication.

Figure 2:
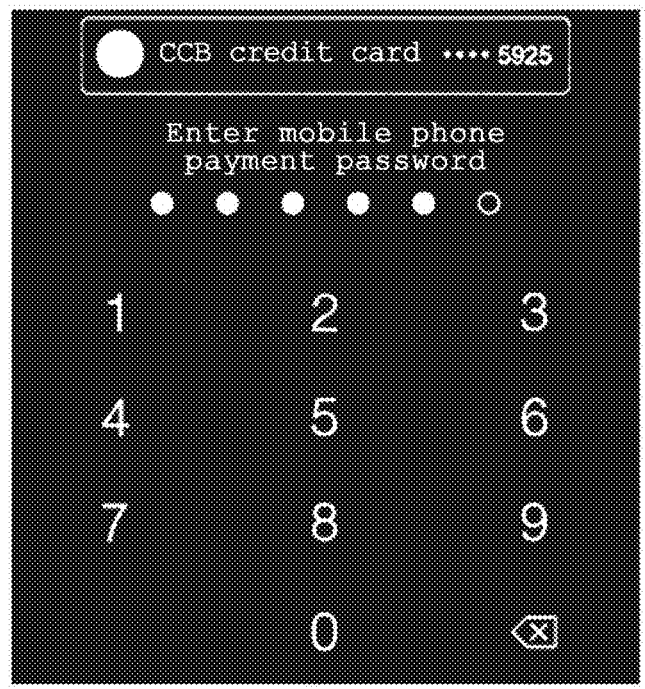
FIG. 2 is a schematic diagram of an NFC payment process according to some embodiments of the present disclosure.
Figure 3:
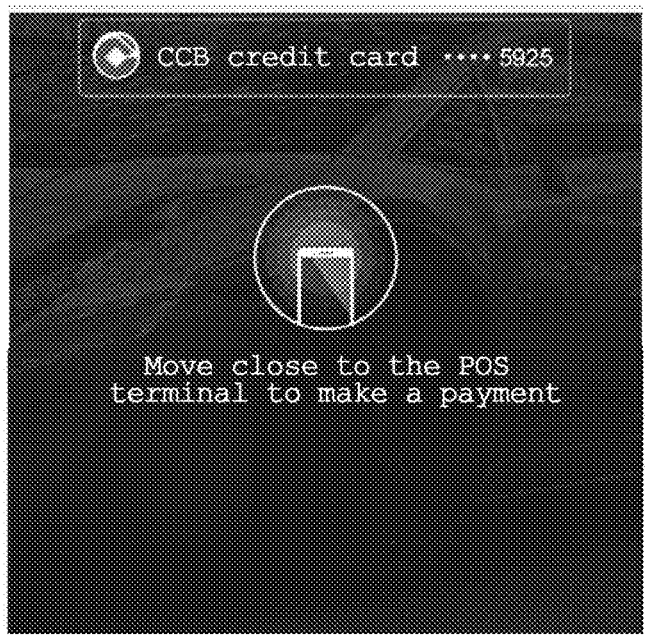
FIG. 3 is a schematic diagram of an NFC payment process according to some embodiments of the present disclosure.
Figure 4:
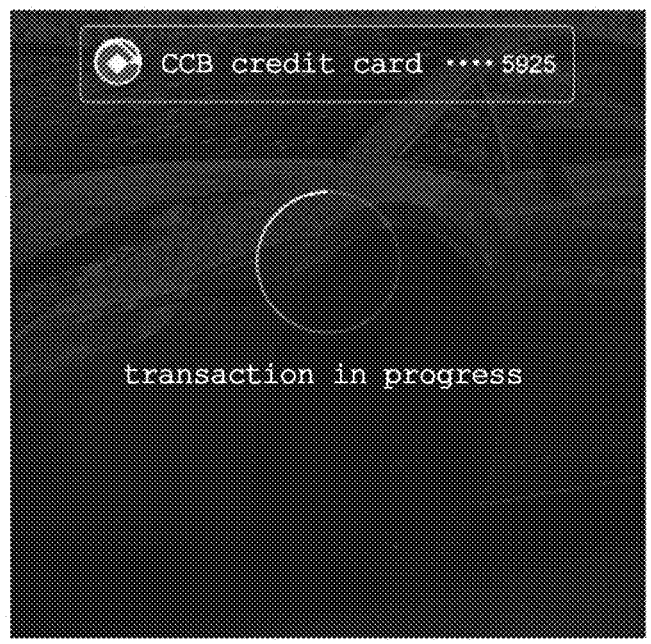
FIG. 4 is a schematic diagram of an NFC payment process according to some embodiments of the present disclosure.

According to some embodiments of the present disclosure, after the mobile phone establishes the NFC connection to the POS terminal, the payment APP receives, through the payment password input interface shown in FIG. 2, a mobile phone payment password input by the user, so as to authenticate the user. In some embodiments of the present disclosure, in order to improve payment experience of the user, during a payment interaction process between the POS terminal and the payment gateway after the payment authentication succeeds, referring to FIG. 3, the payment APP further constantly prompts the user to keep close to the POS terminal, so as to avoid the interruption of the NFC connection after the user moves away from the POS terminal. Moreover, in the payment process in some embodiments, referring to FIG. 4, the payment APP may further present payment state information "transaction in progress" to the user, in the consideration of improving the user experience as well, so that the user can wait patiently until the payment is completed.

Figure 5:
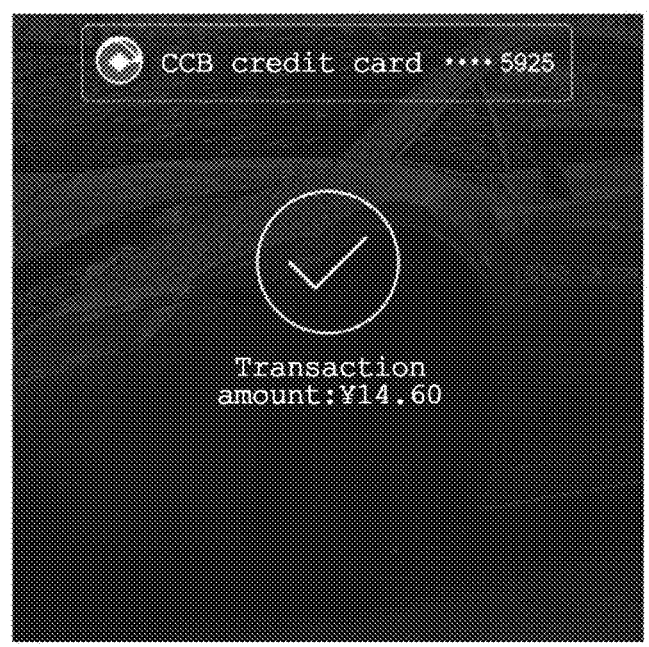
FIG. 5 is a schematic diagram of an NFC payment process according to some embodiments of the present disclosure.
Figure 6:
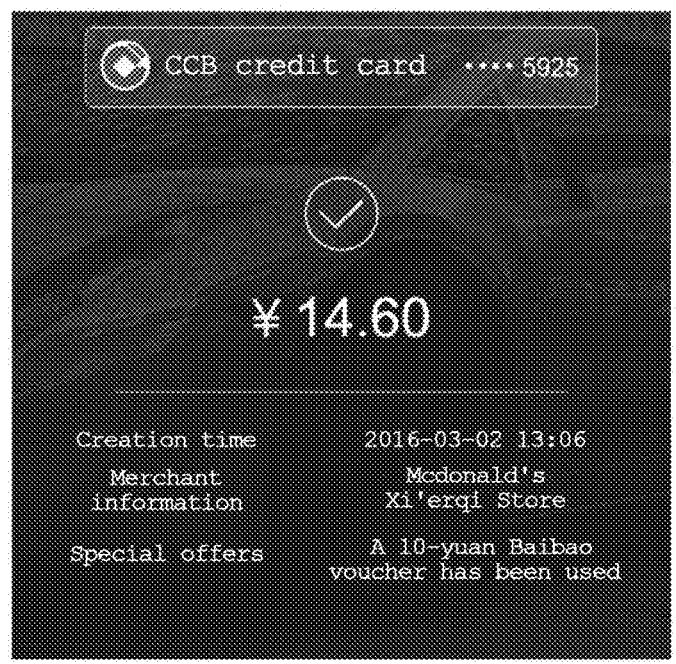
FIG. 6 is a schematic diagram of an NFC payment process according to some embodiments of the present disclosure.

Further, referring to FIG. 5, when the payment is completed in some embodiments, the payment APP first presents prompt information "payment completed" to the user, and then presents detailed information about the current transaction to the user, as shown in FIG. 6 according to some embodiments.

Figure 7:
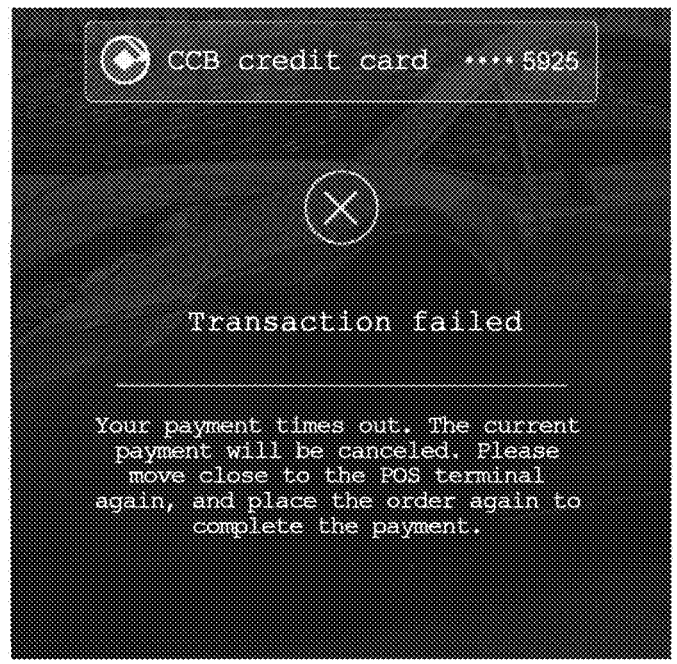
FIG. 7 is a schematic diagram of an NFC payment process according to some embodiments of the present disclosure.

In addition, referring to FIG. 7, if the current payment times out, the payment APP may further present prompt information "transaction failed" to the user, and prompt the user with a subsequent operation to re-start a new round of payment according to some embodiments.

Figure 8:
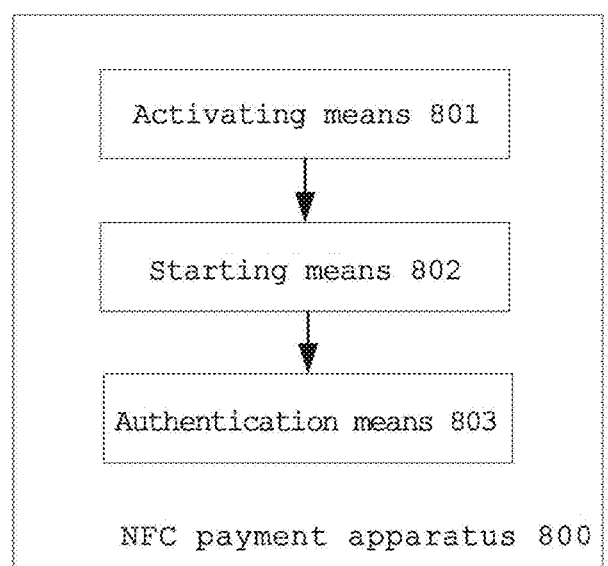
FIG. 8 is a schematic diagram of an NFC payment apparatus implemented on a mobile terminal according to some embodiments of the present disclosure.

FIG. 8 is a schematic diagram of an apparatus according to some embodiments of the present disclosure, which specifically shows an NFC payment apparatus implemented on a mobile terminal. The NFC payment apparatus 800 can be installed in a payment APP, and the payment APP can be installed in a mobile terminal.

As shown in FIG. 8, the NFC payment apparatus 800 includes an activating means or module 801, a starting means or module 802, and an authentication means or module 803. The activating means 801 activates an NFC payment function of the mobile terminal; when NFC payment is planned to be performed, the starting means 802 directly establishes an NFC connection to a POS terminal in an inactive-screen state of the mobile terminal, so as to start a current payment process. The authentication means 803 performs payment authentication on a user, so as to instruct the POS terminal to make a payment when the authentication is completed.

The activation of the NFC payment function of the mobile terminal by the activating means 801 belongs to a presetting process of the NFC payment, and the operations performed by the starting means 802 and the authentication means 803 belong to a payment process of the NFC payment.

In terms of the occurrence order, the presetting process is definitely prior to the payment process. However, those skilled in the art can understand that the foregoing two processes do not occur in close succession. Instead, after the NFC payment function of the mobile terminal is activated, the NFC payment process performed by the connection means 802 and the authentication means 803 occurs only when the user hopes to make a quick payment by using the NFC payment function.

Specifically, the activating means 801 activates the NFC payment function of the mobile terminal.

Herein, the NFC payment function may be activated in at least the following approaches:

1) Establish an association with a payment APP for NFC payment after the NFC function of the mobile terminal is started.

For example, for a smart phone supporting the NFC function, after the user starts the NFC function in the smart phone thereof, one or more APPs that can invoke the NFC function will be provided in an interface of the NFC function, and the user selects a payment APP, thus associating the NFC function with the payment APP selected by the user, so that the activating means 801 in the payment APP activates the NFC payment function of the payment APP.

Those skilled in the art should understand that the foregoing example is merely used for illustration and should not be construed as any limitation to the present disclosure. After the NFC function is started, the mobile terminal may also provide, in other approaches, APPs that can be associated with, for example, provide optional APPs by using a pop-up box. Therefore, those skilled in the art should understand that, although some embodiments of the present disclosure is not exhaustive herein, all other existing or future approaches of providing APPs that can be associated with should be included in the protection scope of some embodiments of the present disclosure, and incorporated herein by reference.

2) Enable the NFC payment function in a payment APP for NFC payment.

For example, the user opens a payment APP that is planned to be used for NFC payment, and when detecting that the mobile phone of the user supports the NFC function, the activating means 801 may prompt the user to enable the NFC payment function, so that NFC quick payment can be enabled after the user chooses to enable the function.

In some embodiments of the present disclosure, after the NFC quick payment function is enabled, the payment APP may further provide an entry of the NFC payment in an interface.

Those skilled in the art should understand that the foregoing example is merely used for illustration and should not be construed as any limitation to the present disclosure. After detecting that the mobile phone of the user supports the NFC payment function, the activating means 801 may provide the user with multiple approaches to enable the NFC payment function, for example, the user may choose to enable the NFC payment function in settings. Therefore, those skilled in the art should understand that, although some embodiments of the present disclosure is not exhaustive herein, all other existing or future approaches to enable an NFC payment function in a payment APP should be included in the protection scope of some embodiments of the present disclosure, and incorporated herein by reference.

Further, those skilled in the art should understand that the foregoing example of activating an NFC payment function is merely used for illustration, and should not be construed as any limitation to the present disclosure. All other existing or future approaches of activating an NFC payment function should be included in the protection scope of some embodiments of the present disclosure, and incorporated herein by reference.

Subsequently, the user can make a quick payment when the user hopes to perform NFC payment.

Subsequently, when the user plans to perform NFC payment, once the starting means 802 detects that the mobile terminal in the inactive-screen state directly establishes an NFC connection to the POS terminal, the current payment process is started.

In a specific payment scenario, when the user plans to perform NFC payment, the user can establish an NFC connection by directly touching the POS terminal with the mobile phone, without activating the screen of the mobile phone.

The inactive-screen state includes, but is not limited to, a screen locked state, a screen off state, and the like. Some embodiments of the present disclosure is intended to provide NFC quick payment for the user, so that the user can directly invoke, in the inactive-screen state through the NFC connection, the NFC payment function of the associated payment APP to make a quick payment.

Therefore, in the inactive-screen state, the starting means 802 constantly monitors an NFC event of the mobile phone, and starts the payment process after an NFC connection between the mobile phone and the POS terminal is detected.

For example, after the user enables the NFC quick payment function, when the mobile phone is in the inactive-screen state, the starting means 802 in the NFC payment apparatus 800 (which can also be considered as an NFC payment control) may constantly monitor an NFC event of the mobile phone, and after the mobile phone touches the POS terminal and establishes an NFC connection to the POS terminal, the mobile phone may notify the starting means 802 of the NFC event, so that the starting means 802 invokes the payment APP, and subsequently the authentication means 803 performs payment authentication on the user.

Next, the authentication means 803 performs payment authentication on the user, so as to instruct the POS terminal to make a payment when the authentication is completed.

The "payment authentication" herein means performing identity authentication on the user before payment. An authentication approach includes, but is not limited to, any existing identity authentication approach applicable to some embodiments of the present disclosure, for example, password authentication, fingerprint authentication, and voice authentication.

For example, the authentication means 803 presents a password input interface to the user, to prompt the user to input a payment password. After the user inputs the payment password, if the password input by the user matches a payment password preset by the user, the current authentication succeeds.

Generally, when the user uses a payment APP for the first time, the authentication means 803 will prompt the user to associate a debit card/credit card for mobile payment, and will record a payment password that is used when the user makes a payment using the associated debit card/credit card.

After the authentication means 803 authenticates the user, an NFC signal may be sent to the POS terminal, to instruct the POS terminal to carry out the current payment.

Subsequently, the POS terminal submits a payment request to a payment gateway and completes the current payment.

For example, the payment gateway may be a payment server corresponding to the payment APP, the POS terminal provides a payment request to the payment server, and the payment server deducts money from the debit card/credit card associated by the user to the payment server, thereby completing the current payment.

In some embodiments of the present disclosure, the payment gateway may notify the payment APP of a payment completion message indicating that the current payment is completed.

Accordingly, the NFC payment apparatus 800 may further include a notification means (not shown in FIG. 8), the notification means receives the payment completion message from the payment gateway, to notify the user of the completion of the current payment.

Herein, approaches to notify the user of the completion of the current payment include at least the following ones:

1) Present a payment completion page to the user.

For example, after receiving the payment completion message, the notification means presents to the user a payment completion page, which simply indicates the completion of the current payment.

2) Present a payment detail page to the user.

For example, after receiving the payment completion message, the notification means presents to the user a payment detail page, which may specifically include various messages about the current payment, such as an order number, an order time, and an order amount.

3) First present a payment completion page to the user, and then present a payment detail page to the user.

For example, after receiving the payment completion message, the notification means first presents a payment completion page to the user, to notify the user that the current payment has been completed, and subsequently, may further present to the user a payment detail page, which may specifically include various messages about the current payment, such as an order number, an order time, and an order amount.

In addition, according to some embodiments of the present disclosure, the NFC payment apparatus 800 further includes a first prompt means (not shown in FIG. 8). When a distance between the mobile terminal and the POS terminal exceeds a predetermined distance, the first prompt means further prompts the user to move closer to the POS terminal.

A maximum communication distance of the NFC connection needs to meet a particular requirement, and when the distance between the mobile phone and the POS terminal increases, for example, the distance is going to exceed the maximum communication distance, the NFC connection between the two may be interrupted. Therefore, an alerting distance may be set with reference to the maximum communication distance, and when it is detected that the distance between the mobile phone and the POS terminal exceeds the alerting distance, the first prompt means prompts the user to move closer to the POS terminal.

According to some embodiments of the present disclosure, the NFC payment apparatus 800 further includes a second prompt means (not shown in FIG. 8). When the current NFC connection is interrupted, the second prompt means prompts the user to re-establish an NFC connection to the POS terminal, so as to start a new payment process.

Herein, the interruption of the NFC connection may be caused by various communication problems, for example, the distance between the mobile phone and the POS terminal exceeds the NFC maximum communication distance, or the payment times out.

After the current NFC connection to the POS terminal is interrupted, the second prompt means may prompt the user to re-establish an NFC connection to the POS terminal, so that the user touches the POS terminal with the mobile phone again to re-establish an NFC connection, and a new payment process is started, including authenticating the user again and making a payment again after the authentication.

It should be noted that the present disclosure may be implemented in software and/or a combination of software and hardware. For example, various means according to the present disclosure may be implemented by an application-specific integrated circuit (ASIC) or any other similar hardware devices, which can include logic circuitry. In some embodiments, the software program of the present disclosure may be executed by a processor to implement the above-mentioned steps or functions. Likewise, the software program of the present disclosure (including the relevant data structure) may be stored in a computer-readable recording medium, for example, a RAM memory, a magnetic or optical driver, a floppy disk, or a similar device. Additionally, some steps or functions of the present disclosure may be implemented using hardware, for example, as a circuit cooperating with the processor to perform various functions or steps.

To those skilled in the art, it is apparent that the present disclosure is not limited to the details of the above-mentioned embodiments, and the present disclosure may be implemented in other specific approaches without departing from the spirit or basic features of the present disclosure. Thus, in any way, some embodiments should be regarded as exemplary, not limitative. The scope of the present disclosure is intended to be defined by the appended claims, rather than the description. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or means stated in a system claim may also be implemented by a single unit or means through software or hardware. Terms such as "first" and "second" are used to indicate names, but do not indicate any particular sequence. Various components disclosed and/or illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An NFC payment method implemented on a mobile terminal, the method comprising:
   activating an NFC payment function of the mobile terminal, the activating comprising: providing a plurality of applications capable of invoking the NFC payment function in a first interface, selecting by a user operation a payment application from the plurality of applications in the first interface, associating the payment application with the NFC payment function of the mobile terminal, and enabling the NFC payment function of the payment application, wherein after the NFC payment function of the payment application is enabled, the mobile terminal enters an inactive-screen state, wherein the payment application associated with the NFC payment function of the mobile terminal is capable of starting a payment in response to detecting a direct NFC connection; and
   starting a current payment process in response to detecting that the mobile terminal in the inactive-screen state has established the direct NFC connection to a POS terminal, wherein in the inactive-screen state all applications installed on the mobile terminal are non-operable through a screen of the mobile terminal, wherein starting the current payment process comprises:
   while the mobile terminal remains in the inactive-screen state, presenting a second interface for a payment authentication on the screen of the mobile terminal in response to detecting that the mobile terminal in the inactive-screen state has established the direct NFC connection to the POS terminal;
   performing the payment authentication on a user based on information entered into the second interface for the payment authentication presented on the screen of the mobile terminal; and instructing the POS terminal to process the payment in response to completing the authentication.

2. The method according to claim 1, wherein the step of starting the current payment process comprises:
   invoking the payment application used for the NFC payment.

3. The method according to claim 1, wherein the performing the payment authentication on the user comprises:
   receiving a payment password input by the user, so that when the payment password input by the user matches a payment password preset by the user, the payment authentication succeeds.

4. The method according to claim 1, the method further comprising:
   while the mobile terminal remains in the inactive-screen state, prompting the user to move the mobile terminal closer to the POS terminal in response to determining that a distance between the mobile terminal and the POS terminal exceeds a predetermined distance, the prompting comprising presenting a prompt interface on the screen of the mobile terminal.

5. The method according to claim 1, further comprising:
   prompting the user to re-establish an NFC connection to the POS terminal when the current NFC connection is interrupted, so as to start a new payment process.

6. The method according to claim 1, wherein after the POS terminal submits a payment request to a payment gateway and completes the payment, the method further comprises:
   receiving a payment completion message from the payment gateway, and notifying the user of the completion of the payment.

7. The method according to claim 6, wherein the notifying the user of the completion of the payment specifically comprises at least one of:
   presenting a payment completion page to the user; and
   presenting a payment detail page to the user.

8. The method according to claim 1, wherein the inactive-screen state comprises a locked-screen state or a screen-off state.

9. The method according to claim 1, wherein providing the plurality of applications capable of invoking the NFC payment function in the first interface comprise:
   providing optional applications capable of invoking the NFC payment function by using a pop-up box.

10. An NFC payment apparatus implemented on a mobile terminal, the apparatus comprising:
    at least one processor; and
    a memory storing instructions, which when executed by the at least one processor, cause the at least one processor to perform operations, the operations comprising:
    activating an NFC payment function of the mobile terminal, the activating comprising: providing a plurality of applications capable of invoking the NFC payment function in a first interface, selecting by a user operation a payment application from the plurality of applications in the first interface, associating the payment application with the NFC payment function of the mobile terminal, and enabling the NFC payment function of the payment application, wherein after the NFC payment function of the payment application is enabled, the mobile terminal enters an inactive-screen state, wherein the payment application associated with the NFC payment function of the mobile terminal is capable of starting a payment in response to detecting a direct NFC connection; and
    starting a current payment process in response to detecting that the mobile terminal in the inactive-screen state has established a direct NFC connection to a POS terminal, wherein in the inactive-screen state all applications installed on the mobile terminal are non-operable through a screen of the mobile terminal, wherein starting the current payment process comprises:
    while the mobile terminal remains in the inactive-screen state, presenting second interface for a payment authentication on the screen of the mobile terminal in response to detecting that the mobile terminal in the inactive-screen state has established the direct NFC connection to the POS terminal;
    performing the payment authentication on a user based on information entered into the second interface for the payment authentication presented on the screen of the mobile terminal; and
    instructing the POS terminal to process the payment in response to completing the authentication.

11. The apparatus according to claim 10, wherein the starting the current payment process comprises:
    invoking the payment application for the NFC payment.

12. The apparatus according to claim 10, wherein the performing the payment authentication on the user comprises:
    receiving a payment password input by the user, so that when the payment password input by the user matches a payment password preset by the user, the payment authentication succeeds.

13. The apparatus according to claim 10, the operations further comprising:
    while the mobile terminal remains in the inactive-screen state, prompting the user to move the mobile terminal closer to the POS terminal in response to determining that a distance between the mobile terminal and the POS terminal exceeds a predetermined distance, the prompting comprising presenting a prompt interface on the screen of the mobile terminal.

14. The apparatus according to claim 10, the operations further comprising:
    prompting the user to re-establish an NFC connection to the POS terminal when the current NFC connection is interrupted, so as to start a new payment process.

15. The apparatus according to claim 10, wherein after the POS terminal submits a payment request to a payment gateway and completes the payment, the operations further comprising:
    receiving a payment completion message from the payment gateway, and notifying the user of the completion of the payment.

16. The apparatus according to claim 15, wherein the notifying the user of the completion of the current payment specifically comprises at least one of:
    presenting a payment completion page to the user; and
    presenting a payment detail page to the user.

17. A non-transitory computer storage medium storing a computer program, which when executed by one or more processors, cause the one or more processors to perform operations, the operations comprising:
    activating an NFC payment function of a mobile terminal, the activating comprising: providing a plurality of applications capable of invoking the NFC payment function in a first interface, selecting by a user operation a payment application from the plurality of applications in the first interface, associating the payment application with the NFC payment function of the mobile terminal, and enabling the NFC payment function of the payment application, wherein after the NFC payment function of the payment application is enabled, the mobile terminal enters an inactive-screen state, wherein the payment application associated with the NFC payment function of the mobile terminal is capable of starting a payment in response to detecting a direct NFC connection; and starting a current payment process in response to detecting that the mobile terminal in the inactive-screen state has established a direct NFC connection to a POS terminal, wherein in the inactive-screen state all applications installed on the mobile terminal are non-operable through a screen of the mobile terminal, wherein starting the current payment process comprises:

while the mobile terminal remains in the inactive-screen state, presenting an second interface for a payment authentication on the screen of the mobile terminal in response to detecting that the mobile terminal in the inactive-screen state has established the direct NFC connection to the POS terminal;

performing the payment authentication on a user based on information entered into the second interface for the payment authentication presented on the screen of the mobile terminal; and instructing the POS terminal to process the payment in response to completing the authentication.

* * * * *